US010902014B1

(12) United States Patent
Adogla et al.

(10) Patent No.: US 10,902,014 B1
(45) Date of Patent: Jan. 26, 2021

(54) REDUCING NETWORK TRAFFIC WHEN REPLICATING MEMORY DATA ACROSS HOSTS

(71) Applicant: Amazon Technologies, Inc., Seattle, WA (US)

(72) Inventors: Eden Grail Adogla, Seattle, WA (US); Brijesh Singh, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 555 days.

(21) Appl. No.: 14/546,816

(22) Filed: Nov. 18, 2014

(51) Int. Cl.
*G06F 16/27* (2019.01)
*G06F 9/455* (2018.01)

(52) U.S. Cl.
CPC .......... *G06F 16/27* (2019.01); *G06F 9/45533* (2013.01)

(58) Field of Classification Search
CPC . G06F 17/30575; G06F 9/45533; G06F 17/30
USPC ......................................................... 707/620
See application file for complete search history.

(56) References Cited

U.S. PATENT DOCUMENTS

| 2008/0155208 | A1* | 6/2008 | Hiltgen | G06F 21/6218 711/154 |
| 2012/0255013 | A1* | 10/2012 | Sallam | G06F 21/564 726/24 |
| 2012/0260304 | A1* | 10/2012 | Morris | H04L 63/0263 726/1 |
| 2013/0152200 | A1* | 6/2013 | Alme | G06F 21/52 726/24 |
| 2014/0337836 | A1* | 11/2014 | Ismael | G06F 9/45558 718/1 |

OTHER PUBLICATIONS

Office action for U.S. Appl. No. 14/546,892, dated Aug. 9, 2016, Adogla et al., "Examining Memory of Execution Environments to Identify Potential Anomalies", 13 pages.
Office action for U.S. Appl. No. 14/546,892, dated Mar. 11, 2016, Adogla et al., "Examining Memory of Execution Environments to Identify Potential Anomalies", 13 pages.
Office Action for U.S. Appl. No. 14/546,892, dated Mar. 9, 2017, Adogla et al., "Examining Memory of Execution Environments to Identify Potential Anomalies", 14 pages.
Office Action for U.S. Appl. No. 14/546,892, dated Apr. 4, 2018, Adogla, "Examining Memory of Execution Environments to Identify Potential Anomalies", 14 pages.
Office Action for U.S. Appl. No. 14/546,892, dated Dec. 8, 2017, Adogla et al., "Examining Memory of Execution Environments to Identify Potential Anomalies", 14 pages.

\* cited by examiner

*Primary Examiner* — Hosain T Alam
*Assistant Examiner* — Tracy M McGhee
(74) *Attorney, Agent, or Firm* — Lee & Hayes, P.C.

(57) ABSTRACT

Technologies are described herein for reducing network traffic when replicating memory data across hosts. The memory data stored in a main memory of the host computer is replicated to a main memory of a second host computer. Memory data from the local data storage of the second host computer and other hosts computers that is a duplicate of memory data from the main memory is identified. Instead of sending the memory data from the main memory that is duplicated, the duplicated memory is copied from the local storage of the second computer or from one or more of the other computers to the main memory of the second host computer.

20 Claims, 11 Drawing Sheets

REDUCING NETWORK TRAFFIC WHEN REPLICATING MEMORY DATA ACROSS HOSTS

BACKGROUND

In some examples, a technique known as "live migration" may be used when moving a virtual machine instance from a source host to a destination host. During the live migration, the state as embodied in the memory of the virtual machine may be replicated to the replicated virtual machine on the destination host in real-time, while the virtual machine continues to run on the source host. During the live migration, pages of guest memory that are associated with the virtual machine are copied to the replicated virtual machine on the destination host.

While the impact on performance of the virtual machine may be minimal with the live migration technique, replication of the memory data between the source host and the destination host may generate excessive network traffic and may be inefficient. These inefficiencies might also exist when migrating memory data from one host to another host for other purposes. For example, transferring a large amount of memory data relating to a database might negatively affect the performance of a network.

It is with respect to these and other considerations that the disclosure made herein is presented.

DETAILED DESCRIPTION

Figure 1:
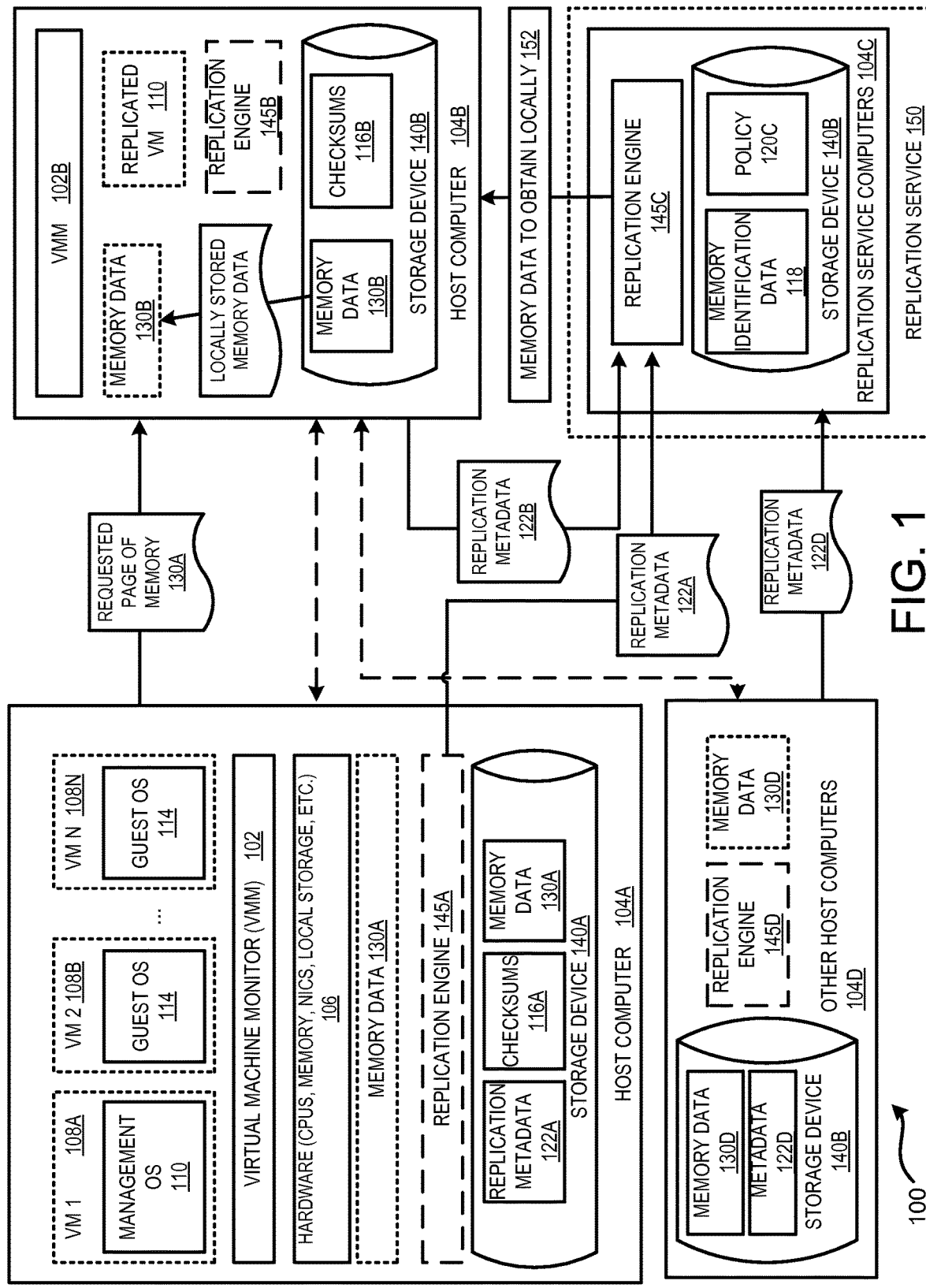
FIG. 1 is a block diagram depicting an illustrative replication environment for replicating memory data across hosts.

The following detailed description is directed to technologies for reducing network traffic when replicating memory data across hosts. According to examples provided herein, instead of sending all of the memory data to be replicated from a source host computer to the destination host over a network, at least a portion of the memory data to be replicated might be obtained from the memory of one or more other host computers (e.g., one or more hosts selected from potential source computers) that are different from the source host computer storing the memory to be replicated.

According to some configurations, a replication service may be used to coordinate the replication of the memory data from a source host to a destination host. In some examples, memory data that are to be replicated in the memory of the destination host might already be available on one or more of the other potential source computers and/or the destination host. For example, memory data in use by a virtual machine on the source host might already be available in local storage of one or more of the other potential source hosts or the destination host. For instance, the destination host or one or more of the other potential source hosts might already have stored some of the memory data in response to starting a virtual machine, a previous receipt of a memory page, or the like. Instead of transferring the memory data to be replicated over the network from the source computer to the destination computer, the replication service may instruct the destination host to copy the duplicate memory data from the destination host and/or from one or more other hosts selected from the other potential source hosts. As such, network traffic may be reduced since the memory data are obtained from the destination host and/or from a host that might be closer to the destination host as compared to the source host.

Different mechanisms may be utilized to determine whether memory data to be replicated may be obtained from local storage associated with the destination host, or from one or more of the other hosts. According to a checksum mechanism, all or a portion of the host computers (e.g., the source host, the destination host, and other potential source hosts) maintain checksums for chunks of memory data (e.g. pages of the memory) that are locally stored. During replication, the checksums from the source host and the other hosts may be compared to determine the duplicate memory data that are stored locally. According to some configurations, the replication service compares the checksums obtained from the source host storing the memory to be replicated with the other hosts and instructs the destination host what memory data to obtain from a local storage and what memory data to request from one or more other hosts. The destination host copies the duplicate memory data from the local storage device and/or from one or more of the other potential source hosts. The destination host may request memory data that are not available locally on the destination computer from one or more hosts selected from the potential source hosts (e.g., select a host that is closer to the destination host as compared to the source host), or possibly request the memory data from the source host computer storing the memory data to replicate.

According to another mechanism, the source host computer may keep track of the "dirty" (i.e. written to) memory data. For example, when memory is written to, a flag may be set in a page map indicating that the memory data (e.g., a page or block) is no longer "clean." "Clean" memory may refer to memory data (e.g., a page of memory) that has not been written to since being loaded by the source host.

During replication of the memory data, a status of the pages of memory to transfer (e.g., clean or dirty) may be requested by a replication service and/or the destination host. In some examples, the source host returns metadata that identifies the pages of memory that are dirty. The memory pages that are clean might be available on the destination host (e.g., a local storage) or the memory data requested to be replicated might be available on a host that is closer on a network (e.g., fewer nodes between the source and the destination) to the destination host as compared to the source host. In some examples, the checksum mechanism described above may be used to determine whether a duplicate of the memory data to be replicated is stored in the local storage. As discussed above, the destination host may copy the duplicate memory data from the local storage instead of receiving the memory data over the network. The dirty memory pages may be obtained from the source host over the network.

In some configurations, the memory data that are locally available on different computing devices may be monitored. For example, each host computer may be configured to monitor the memory data that are locally available on the host. In other examples, one or more hosts might be used to provide the replication service that maintains memory identification data that identifies the memory data currently stored by the group of computers. According to some examples, host computers may send memory identification to the replication service periodically or in response to an event (e.g., a page of memory being loaded). The memory identification data might identify memory data that is stored in a local data storage device and/or in the main memory of a host computer. This knowledge of the available memory that is locally stored (e.g., in the local data storage or the main memory of a computer) might be used for a variety of different purposes.

According to some configurations, a destination host for replication may be selected by the replication service based, at least in part, on the duplicate memory data of the requested memory data to replicate that are already resident in local memory or local data storage of a host. For example, a host that is selected for replication might already have a large portion of the memory data requested to be replicated locally available. As such, the source host would not need to transfer the memory data over the network to the destination host. Instead, the destination host could copy the memory data from the local data store of the destination host and/or from one or more other hosts.

In other examples, a destination host may be selected by the replication service when it is closer to another host that has duplicate memory data locally available as compared to the distance of the destination host to the source host. For example, a host that has a large portion of duplicate memory available might not be a candidate for selection as the destination host due to resource constraints (e.g. not enough processing or memory resources). A host near the host that has a large portion of duplicate memory available might be selected as the destination host. In this example, during the replication of the memory data, the destination host may fetch the memory data from the closer host instead of fetching the memory data from the source host that is farther away. Other factors might also be used by the replication service when selecting the destination host. For example, an available network bandwidth at a network location might be used when selecting a destination host. For example, a destination host that is at a network location having a higher bandwidth might be selected over another host that is at a network location having a lower bandwidth. The available processing resources, such as processor usage, might also be used when selecting a destination host. For example, a destination host might be selected that has more available processing resources (e.g., lower processor usage) as compare to other potential destination hosts. In some cases, the selected hosts from which to obtain memory may change before the replication is complete.

In some configurations, portions of memory data on a host might be prevented from being erased or made unusable after it is no longer being used by the host. For example, memory data might be prevented from being erased when it is predicted that the memory data will be requested again. Additional details regarding the various components and processes described above for reducing network traffic when replicating memory data across hosts will be presented below with regard to FIGS. 1-11.

It should be appreciated that the subject matter presented herein may be implemented as a computer-implemented process, a computer-controlled apparatus, a computing system, or an article of manufacture, such as a computer-readable storage medium. These and various other features and examples will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, hand-held computers, personal digital assistants, cellular telephone devices, electronic-book readers, special-purposed hardware devices, network appliances, and the like. The technologies described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures.

FIG. 1 is a block diagram depicting an illustrative replication environment 100 for replicating memory data across hosts. In some configurations, the replication environment 100 may include a virtual machine monitor ("VMM") 102, such as a hypervisor that allows multiple independent guest operating systems to concurrently execute on a single host computer 104. In order to enable this functionality, the VMM 102 abstracts the hardware of the host computer 104 to create one or more virtual machines 108A-108N (referred to herein generally as virtual machine 108). The VMM 102 may be implemented in the hardware of the host computer 104, or it may be implemented as a software module that executes at a low-level in the host computer to provide services to the virtual machines 108.

One virtual machine 108A may host a management OS 110. The management OS 110 may be automatically started by the VMM 102 upon startup of the host computer 104, and may provide administrators of the host computer tools and facilities for managing the VMM and the other virtual machines 108B-108N. The virtual machine 108A hosting the management OS 110 may execute at a higher privilege level than the other virtual machines 108B-108N, and the management OS may also provide services to the other virtual machines through the VMM 102, such as loading of hardware drivers for the host computer, virtualizing hardware devices within virtual machines 108B-108N, arbitrating access to the hardware of the host computer 104, and the like The other virtual machines 108B-108N may each run an instance of a guest OS 114 as well as execute one or more applications to provide services to consumers across one or more networks 112. The examples described herein are applicable to other replication environments beyond the replication environment 100 described above and shown in FIG. 1. For instance, in some configurations, the host computer may not include the VMM 102. In other configurations, the management OS 110 may run directly above and control access to the hardware resources 106 of the host computer 104. In other examples, the functionality of the VMM 102 may be integrated with the management OS 110.

According to some configurations, the VMM 102, in conjunction with the management OS 110, controls the allocation and sharing of hardware resources 106 of the host computer 104 among the virtual machines 108. The hardware resources 106 may include central processing units ("CPUs") or other types of processors, physical memory, network interface cards ("NICs"), local storage devices, such as a storage device 140A, input/output ("I/O") controllers, and the like. For example, each virtual machine 108 may be allocated a portion of the physical memory of the host computer 104, depending on the requirements of the guest OS 114 and/or parameters specified by an administrator.

The VMM 102 may present the allocated portion of physical memory to each VMM 102 as a contiguous memory address space starting at a guest physical address of zero. The VMM 102 may maintain memory-mapping tables (not shown) to translate guest physical memory addresses accessed by the guest OS 114 executing in the virtual machine 108 to system physical addresses on the host computer 104. Similarly, the VMM 102, in conjunction with the management OS 110, may control access of the guest OS 114 and applications executing in the virtual machines 108 to storage devices, other host computers 104C, and the like across networks.

During operation, most applications and/or operating systems periodically flush the state of the memory and/or the CPU to a storage device for the sake of persistence. For example, the guest operating system 114 may issue write operations to commit pages of memory to the local storage device 140A. In addition, the guest OS 114 may also issue write operations to write pages of memory to a page cache on the local storage device 140A in order to provide virtual memory for applications. The contents of the memory of a computer may also be written to storage in other situations. For example, the contents of the memory may be stored to the local storage device 140A, or some other storage device, when the memory is snapshotted. A "snapshot" of the memory may refer to storing a state of the memory and/or the CPU at a particular point in time. A snapshot may occur at predetermined times and/or in response to an event (e.g., a computer entering a low power state, such as hibernation).

In some examples, a virtual machine 108 on the host computer 104A may be replicated to another host computer 104, such as the replicated VM 110 on the destination host computer 104B. As described above, the replication engine 145 may utilize continuous "live migration" to replicate the state of a virtual machine 108, such as the VM 108B, to the destination host computer 104B in some configurations.

During the replication of the VM 108 from the source host computer 104A to the destination host computer 104B, the memory data used by the VM 108 may be identified and replicated using one or more replication engines 145. According to some configurations, a replication engine 145C that is part of the replication service 150 might be used to coordinate the replication of memory data 130 from one host computer to another host computer. For example, the replication engine 145C may determine the memory data 130A that is to be copied from the host computer 104A to the destination host computer 104B as well as determine the memory data 130B that is to be obtained from the destination host computer 104B. After determining the memory data 130A to copy from the host computer 104A, the replication engine 145C may instruct the destination host computer 104B to request a portion of the memory data 130A (e.g., the requested page of memory 130A) from the host computer 104A. The replication engine 145C might also instruct the destination host computer 104B to copy the memory data 130B to the main memory of the destination host computer 104B.

In other configurations, a replication engine 145 that is part of another host computer 104 might be used to during the replication of the memory data 130. In some configurations, the memory data 130 that is replicated may include the memory data 130 in use by the VM 108 being replicated and the local disk storage used by the VM 108. For purposes of illustration, assume that the replication engine 145A and/or replication engine 145C has identified memory data 130A to be replicated to the memory of the host computer 104B.

The replication of the memory data 130A may be performed by a replication engine 145 executing on the source host computer 104A and/or the destination host computer 104B and/or the replication service 150. The replication engine 145 may represent a component of the VMM 102, a component executing in the management OS 110 or the VMM 102, a component executing in the replication service 150, or any combination of these and other components on the source host computer 104A, the destination host computer 104B and/or the replication service 150.

As briefly discussed above, different mechanisms may be utilized by a replication engine 145, such as the replication engine 145C, to determine whether the memory data 130A to be replicated may be obtained from the local storage device 140B, or from another host, such as one of the other host computers 104C, that is closer to the destination host 104B as compared to the source host 104A. According to a checksum mechanism, the source host 104A stores checksums 116A and the destination host 104B stores checksums 116B for chunks of memory data (e.g. pages of the memory) that are locally stored and/or currently in use or reside in memory. In some configurations, these checksums 116A-116B are provided to the replication service 150 by the associated replication engine 145A-145B. According to some examples, the checksums 116 are provided as replication metadata 122. Generally, the checksums 116A uniquely identify different portion of the memory data such that two portions of the memory data that have the same checksum are "duplicates" (i.e. the same). Different mechanisms may be used to generate the checksums 116. For example, a hashing function may be used to generate the checksums 116A and 116B. More details are provided in this regard below with respect to FIG. 2.

During replication, a replication engine, such as one or more replication engines 145A-145C, may obtain the checksums 116 from the source host computer 104A and the destination host computer 104B. In some examples, the replication engine 145C compares the checksums 116A that are associated with the memory data 130A with the checksums 116B that are associated with locally stored memory data 130B to identify the duplicate memory data that are stored locally on the destination host computer 104B. In other examples, the replication engine 145A and/or the replication engine 145B compares the checksums 116A that are associated with the memory data 130A with the checksums 116B that are associated with locally stored memory data 130B to identify the duplicate memory data that are stored locally on the destination host computer 104B.

The replication engine 145 (e.g., the replication engine 145C of the replication service 150) may instruct the destination host 104B to copy the duplicate memory data from the storage device 140B to the memory data 130B, thereby eliminating the need for the duplicate memory data to be sent over one or more networks (not shown) that may couple the host computers 104. In some examples, the replication engine 145B might copy the duplicate memory data from a memory of the host computer 104B to the memory data 130B. The memory data that are not available may be obtained from the source host computer 104A, or possibly another host computer that is closer to the destination host computer 104B as compared to the source host computer 104A.

According to another mechanism, the source host computer 104A may keep track of the dirty memory data. During replication of the memory data 130A to the destination host computer 104B, a replication engine, such as the replication engine 145C that is part of the replication service 150 and/or the replication engine 145B on the destination host computer 104B, may request a status of the pages of memory to transfer (e.g., clean or dirty). In some examples, the replication engine 145A on the source host computer 104A provides data to the requesting replication engine 145 that identifies the pages of memory that are dirty. According to some examples, the status of the pages of memory are sent as the replication metadata 122A.

The memory pages that are clean might be available on the destination host computer 104B (or they might be available on a host that is closer to the destination host 104B as compared to the source host 104A). In some examples, the checksum mechanism described above may be utilized by the replication engine 145B to determine whether a duplicate of at least a portion of the memory data 130A to be replicated is stored in the local storage 140B, and/or in some examples in the main memory of the host computer 104B. The replication engine 145B may copy the duplicate memory data from the local storage 140B instead of fetching the memory data over the network from the host computer 104A. The dirty memory pages may be obtained from the source host computer 104A over the network.

In some configurations, the memory data that are locally available on different computing devices may be monitored. For example, the replication engine 145 on the hosts 104 may monitor the memory data that is locally available. As discussed above, the memory identification data 118 that indicates the memory data that are locally available may be provided to the replication service 150. The replication service 150 may monitor the memory data that are locally available on the different host computers 104. The replication engine 145 might track data indicating how often portions of memory data are requested. For example, some pages of memory might be frequently requested (e.g., memory pages relating to an operating system, a particular type of virtual machine, or program).

According to some configurations, a destination host for replication may be selected from potential destination hosts 104 by the replication service 150, a replication engine 145, a VMM, or some other computing device or component, based at least, in part, on the duplicate memory data that are already resident in local memory or local data storage of a host. For example, a host that is selected by the replication service 150 for replication might already have a large portion of the memory data locally available. The destination host computer that is selected might be selected based on the number of blocks, or memory pages, that are locally available. As such, the source host would not need to transfer the memory data over the network to the destination host.

In other examples, a destination host computer may be selected when it is closer to another host computer that has duplicate memory data locally available as compared to the source host. For example, a host computer 104 that has a large portion of duplicate memory available might not be a candidate for selection as the destination host due to resource constraints. A host computer 104 near the host computer that has a large portion of duplicate memory available might be selected as the destination host. In this example, during the replication of the memory data, the destination host computer may fetch the memory data from the closer host computer instead of fetching the memory data from the source host computer. In other examples, the replication service 150 may select a destination host based at least, in part, on an available bandwidth at a network location of the destination host 104. For example, a destination host 104 that is at or near a network location having a higher bandwidth might be selected over another host that is at a network location having a lower bandwidth.

In some configurations, the replication engine 145 may prevent portions of memory data (e.g., blocks or memory pages) from being erased or made unusable after it is no longer is being used by the host computer. For example, memory data might be prevented from being erased when it is predicted that the memory data will be requested again. According to some configurations, the replication engine 145 may maintain blocks of memory data in the memory that are the most often requested blocks. In other examples, the replication service 150 may instruct one or more host computers 104 to maintain certain memory data.

In some configurations, the replication service 150 is provided by one or more of the host computers 104. As discussed above, the replication service 150 may maintain memory identification data 118 that identifies the memory data stored by other host computers, such as hosts 104A, 104B and 104D. For example, the memory identification data 118 may identify the memory data stored in the local storage and/or the main memory of all or a portion of the host computers 104. In some configurations, the memory identification data 118 identifies all of the memory data associated with an execution of virtual machines. The replication service 150 might request identification of the memory data currently stored by a host computer and/or the host computer might periodically send the identification of the currently stored memory data to the replication service 150.

The replication service 150 may identify one or more hosts that have at least a portion of the requested memory in a main memory or a local storage device 140 associated with the host computer 104. Some identified hosts may store more of the requested memory data as compared to other hosts. In some configurations, the replication service 150 ranks the host computers 104 according to an amount of the memory data that is available locally.

According to some configurations, the replication service 150 may determine a physical location of the hosts relative to one another. For example, the replication service 150 might identify the hosts that are physically closer to the source host computer 104A. The replication service 150 might also determine the closest host that might not have the requested memory data locally stored, to a host determined to have requested memory data locally stored.

As briefly discussed above, the replication service 150 might select a destination host for the replication of the memory 130A. The replication service 150 might select the destination host using different selection criteria, such as how much of the requested memory data the host is storing locally, available resources of the host (e.g., memory, processing), a distance of the host to the source host computer 104A, a distance of the host to a host identified to have at least a portion of the requested memory data 130A locally stored, and the like. According to some configurations, the replication service 150 may generate a list of hosts 104 that are potential destination hosts and filter out hosts that are unsuitable based on one or more criteria. For example, the replication service 150 could filter out host computers 104 that do not have the hardware necessary to host an instance being migrated, filter out host computers 104 that do not have the necessary resources to host new instances, filter out host computers 104 that are far from the source host computer 104A from a network perspective, filter out host computers 104 based on an amount of memory in common (based on the checksums), and the like. The replication service 150 may randomly select a destination host 104 from the filtered list or using some other mechanism (e.g., based on an amount of memory in common). In other configurations, instead of the replication service 150 filtering out hosts that do not share memory in common, the replication service 150 may take the list of potential destination hosts and identify one or more of the hosts that have the most memory in common (based on the checksums) and randomly pick one of the hosts to serve as the destination host computer 104B.

After selecting the host, the replication of the memory data 130A from the source host computer 104A to the main memory of the selected destination host computer 104 may begin. More details regarding reducing network traffic while replicating memory data across hosts are described below.

Figure 2:
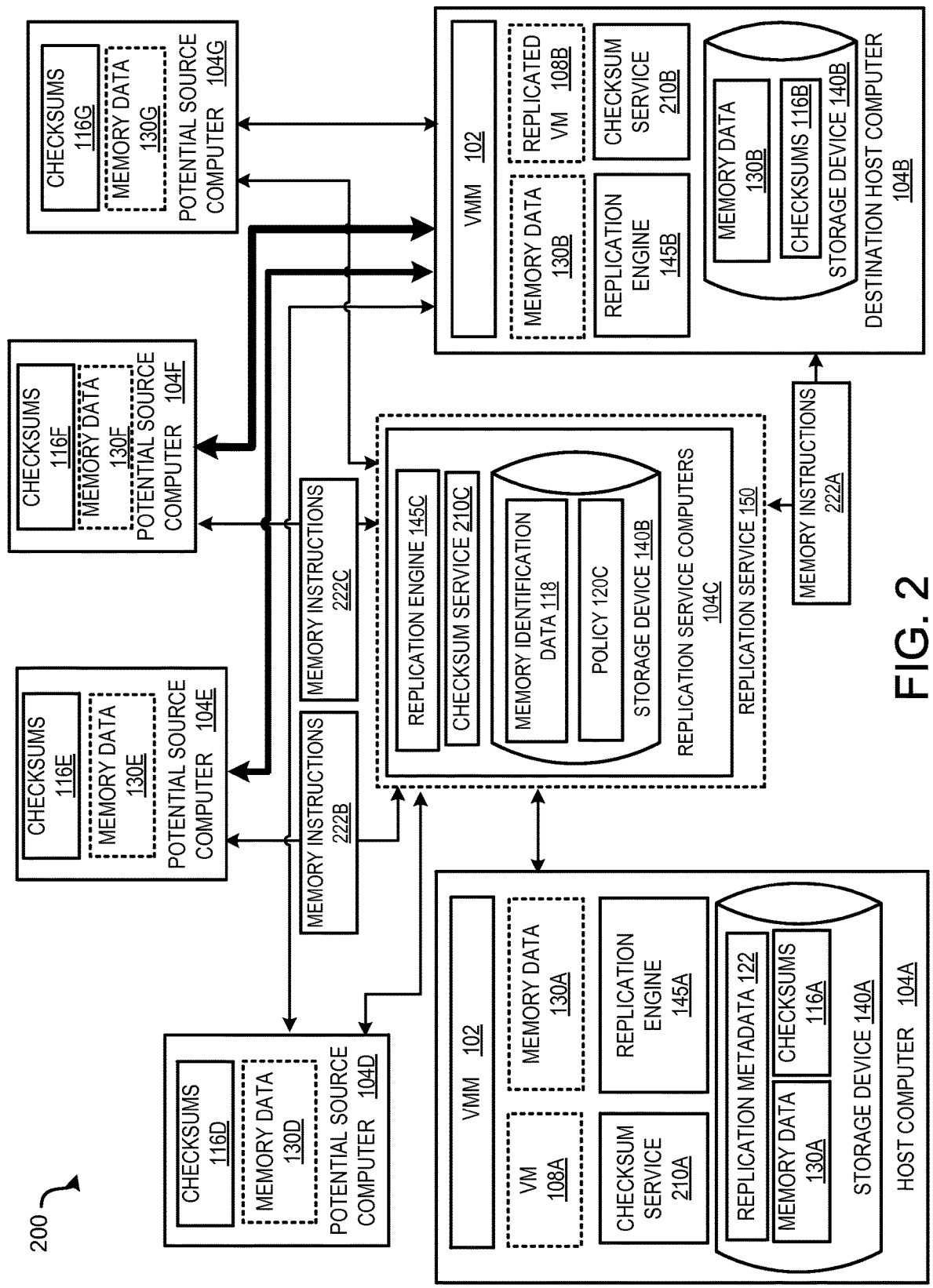
FIG. 2 is a block diagram depicting an illustrative replication system for using checksums to select one or more source computers from which to obtain memory data requested to be replicated across hosts.

FIG. 2 is a block diagram depicting an illustrative replication system 200 for using checksums 116 to select one or more source computers from which to obtain memory data requested to be replicated across hosts. As discussed above, a virtual machine 108 may be run by a host computer 104A, and may execute a guest OS and one or more applications (not shown) to provide services to consumers over the network 112. In addition, in some cases the virtual machine 108A may be replicated to a destination host computer 104B, across the network 112.

As discussed above, a replication service 150 may be used to facilitate the replication of the memory data 130A to the destination host computer 104B. In some examples, a replication engine, such as the replication engine 145C that is part of the replication service 150, may compare the checksums 116A that are associated with the memory data 130A to the checksums 116D-116G that are associated with the memory data stored by the potential source computers 104D-104G. According to some examples, the replication engine 145C may also compare the checksums 116A with the checksums 116B. The replication engine 145C may compare the checksums 116A to the checksums 116B and 116D-116G to identify the chunks of memory data (e.g., blocks or pages of memory) that are the same.

The checksums 116 might be generated before or after the replication of the memory data 130A begins. In some examples, a checksum service 210, such as checksum services 210A and 210B, may be configured to generate the checksums 116A and 116B, respectively. In other examples, a checksum service 210C may be part of the replication service 150 and may be used to generate the checksums 116A and/or 116B and/or checksums 116D-116F. According to some configurations, each of the potential source computers 104D-104G may be configured to generate the checksums 116D-116G, respectively. Each page of memory may be hashed by the checksum service 210A to create a checksum 116A when the page is loaded into the memory of the source host computer 104A. In other examples, the checksum 116 for the page of memory may be generated by the checksum service 210 when the page of memory is received from another computer (e.g., during the same or another replication process). The checksums 116 may be stored by the checksum service 210 in a local storage device 140, or some other memory.

According to some configurations, the checksum service 210 may perform a hash of a block or page or memory to generate a checksum 116. Many different types of hashing mechanisms may be utilized by the checksum service 210. Generally, if duplicate memory data exists at two different locations, then each portion of the memory data will have the same checksum 116. In some examples, an index may be stored by the checksum service 210 that identifies the checksums 116 that are associated with the different portions of the memory data.

During the replication of the memory data 130A from the source host computer 104A to the destination host computer 104B, the replication engine 145C in the replication service 150 may be used to coordinate the replication the memory data 130A. As discussed above, the replication engine 145C may identify the memory data to replicate and provide memory instructions 222A to the destination host 104B indicating what memory data 130 to copy from one or more potential source computers 104D-104G and/or obtain from local memory or storage 140B of the destination host. The instructions 222A may also indicate what memory data to request from the source host computer 104A. In some examples, the replication engine 145C requests from the source host computer 104A the checksums 116A associated with the memory data 130A to be replicated. In the case of replicating the VM 108A, the memory data 130A is memory data that is associated with the VM 108A. In some configurations, the replication engine 145A may send the checksums 116A to the replication engine 145C at the start of the replication of the VM 108 or at the start of replication of other memory data.

As discussed above, the replication engine 145C may compare the checksums 116A to the other checksums 116B and 116D-116G to determine the local availability of memory data 130A that is to be replicated (e.g., in the local storage or in some cases, in the main memory of one or more of the potential source computers 104D-104G and/or the destination host 104B). During replication, the replication engine 145B may fetch the memory pages to be replicated locally and/or from one or more of the potential source computers 104D-104G. In some examples, the replication engine 145C instructs the replication engine 145B as to what memory data 130B to obtain locally and what memory data 130B to obtain from one or more of the potential source computers 104D-104G. Thus, clean memory pages that are to be replicated may not be retrieved using the network 112. Instead, all or a portion of the clean memory pages of the memory pages might be retrieved from some other source. As such, clean memory pages may not be copied between the source host computer 104A and the destination host computer 104B over the network 112 for replication, thus reducing the amount of network bandwidth required by the replication process.

According to some configurations, the replication service 150 selects one or more of the potential source computers 104D-104G that are identified as storing at least a portion of the requested memory to be used a memory source. The one or more potential source computers 104D-104G might be selected by the replication service 150 using different selection criteria. For example, the selection might be based on a network location of the potential source computer relative to the destination host 104B (e.g., number of hops). For example, the replication service 150 might select the potential source computers 104F and 104G since those computers are closer to the destination host computer 104B as compared to the potential source computers 104D and 104E. In some configurations, a potential source computer that is on the same rack, and possibly on the same computer or connected via an access switch, as the destination host 104B may be selected before a potential source computer that is connected to the destination host 104B via an aggregation switch. Similarly, a potential source computer that is connected to the destination host 104B via an aggregation switch might be selected before a potential source computer that is connected to the destination host 104B via a core switch. Generally, communication between a potential host computer that is connected via an access switch to the destination host 104B will be faster as compared to potential host computers connected to the destination host 104B via an aggregation switch or core switch.

The replication service 150, and or some other component (e.g., a replication engine 145) might also select the one or more potential source computers based, at least in part, on a network bandwidth available between the potential source computers and the destination host computer 104B. In the example illustrated in FIG. 2, the available bandwidth is indicated by a thickness of the line between the potential source computer and the destination host computer 104B. In the current example, a thicker line indicates a higher available bandwidth. As illustrated, the available bandwidth between the potential source computer 104F and the destination host computer 104B is the largest, followed by the available bandwidth between the destination host computer 104B and the potential source computers and 104E, followed by the available bandwidth between the destination host 104B and the potential source computers 104D and 104G. According to some configurations, the replication service 150 might select the potential source computer 104F instead of the potential source computer 104G based on the higher available bandwidth even though the potential source computer 104G is closer to the destination host computer 104B. In other cases, as described below, the replication service 150 might select two or more of the potential source computers.

According to other configurations, the replication service 150 might also determine the available resources of the potential source computers 104D-104G (e.g., memory, processing usage such as CPU usage), a current or predicted usage of the potential source computers 104D-104G during the replication, an amount of memory data to replicate available from the potential source computers 104D-104G, and the like. Any of the above, or other selection parameters might be utilized during the selection process.

As briefly discussed, one or more of the potential source computers 104D-104G might be selected. For example, a predetermined number of potential source computers 104D-104G might be selected by the selected by the replication service 150, the number of potential source computers 104D-104G might be selected based on an amount of memory data to replicate, or the decision of how many potential source computers 104D-104G to utilize might be made using some other factor(s).

In some configurations, the replication service 150 determines to migrate a virtual machine, such as the VM 108A from the host computer 104A to the destination host computer 104B to create the replicated VM 108B. After the replication service 150 identifies the checksums associated with the memory data 130A on the host computer 104A to replicate to the destination host computer 104B. The replication service 150 may then locate a copy of the identified memory data to replicate on potential source computers (e.g., one or more of the potential source computers 104D-104G). For example, the replication service 150 may access the memory identification data 118 stored in the storage device 140B to identify the potential source computers that are storing at least a portion of the memory data 130A to replicate. In some examples, the memory identification data 118 may be stored in a database that may be accessed and searched by the replication service 150 to locate the potential source computers that also store a portion of the memory to replicate.

After identifying the potential source computers that store at least a portion of the memory to replicate, the replication service 150 may calculate for each identified potential source computer how long it will take to copy the available memory on the potential source computer to the destination host computer 104B. In other examples, the replication service 150 might perform this calculation for a portion of the identified potential source computers. The time it takes to copy the available memory on a potential source computer to the destination host computer 104B may depend on a variety of different factors. For example, the factors may include, but not limited to the network location of the potential source relative to the destination host, an available network bandwidth between the potential source and the destination host, the available processing resources of the potential source, the available memory resources of the potential source, and the like.

In some configurations, the replication service 150 ranks the identified potential source computers based, at least in part, on the calculated time to copy the available memory from the potential source computer to the destination host computer 104B (e.g., the higher the rank, the faster the copying). After ranking the potential source computers, the replication service 150 might select all or a portion of the potential source computers to use during the replication of the memory data 130A. For example, the replication service 150 might select the potential source computers identified to have the fastest copy times.

In other examples, the replication service 150 might select the potential source computers based on a "cost" of the transfer of the memory from the potential source computer to the destination host computer 104B. For example, two or more potential source computers may be able to copy the memory equally fast, but one or more other factors might be used by the replication service 150 to select the potential source computers. For example, a potential host that is hosting more VMs, might not be selected as a potential source computer when other potential source computers are available. Similarly, a potential source computer might not be selected when the potential source computer is performing certain types of operations or hosting VMs associated with specified customers. After selecting the potential source computers, the replication service 150 sends memory instructions requesting the potential source computer to send the memory to the destination host computer 104B.

As another example, the replication service 150 might re-evaluate (e.g., every 1-10 ten seconds or some other time) the availability of memory on the potential source computers and the time or cost it takes to copy the available memory from the identified potential source computers to the destination host computer 104B. In some configurations, the replication service 150 might generate an index that may be utilized to determine the potential source computers to select. For example, the replication service 150 might use the index to search for the potential source computers that have the most memory and currently are able to copy the pages at a faster rate (as compared to other potential source computers) to the destination host.

For purposes of explanation, assume that the replication service 150 has selected the potential source computers 104E-104F as sources of memory data to be replicated to the destination host computer 104B.

After selecting the source computers 104E-104F to be used to replicate the data, the replication service 150 may provide the memory instructions 222A to the destination host computer 104B and/or the memory instructions 222B to the source computer 104E and the memory instructions 222C to the source computer 104F. As discussed above, the replication service 150 might use the memory instructions 222A to instruct the destination computer 104B to obtain memory data from the selected source computers 104E-104F. In other examples, the replication service 150 might use the memory instructions 222B and the memory instructions 222C to instruct the selected source computers 104E-104F to provide memory data to be replicated to the destination host computer 104B.

According to some configurations, the replication service 150 might re-select one or more of the potential source computers 104D-104G while the memory is being replicated to the destination host computer 104B and before the replication from the host computer 104A to the destination host computer 104B is complete. The reselection might be performed by the replication service 150 periodically and/or in response to some other event or condition. For example, the replication service 150, or some other component, might determine that an available bandwidth between a previously unselected potential source computers has increased that is closer (e.g., fewer hops) to the destination host 104B as compared to a currently selected source computer. For example, the replication service 150 might select the potential source computer 104G as a source computer in response to determining that the available bandwidth between the potential source computer 104G and the destination host computer 104B has increased (e.g., above a specified threshold). The replication service 150 might also determine that the available resources (e.g., memory or processing) might have increased or decreased since the previous selection. As a result of the increase or decrease of the available resources, the replication service 150 might deselect a source computer and/or select a previously unselected potential source computer 104. Generally, the reselection might be performed based on a variety of different conditions.

Figure 3:
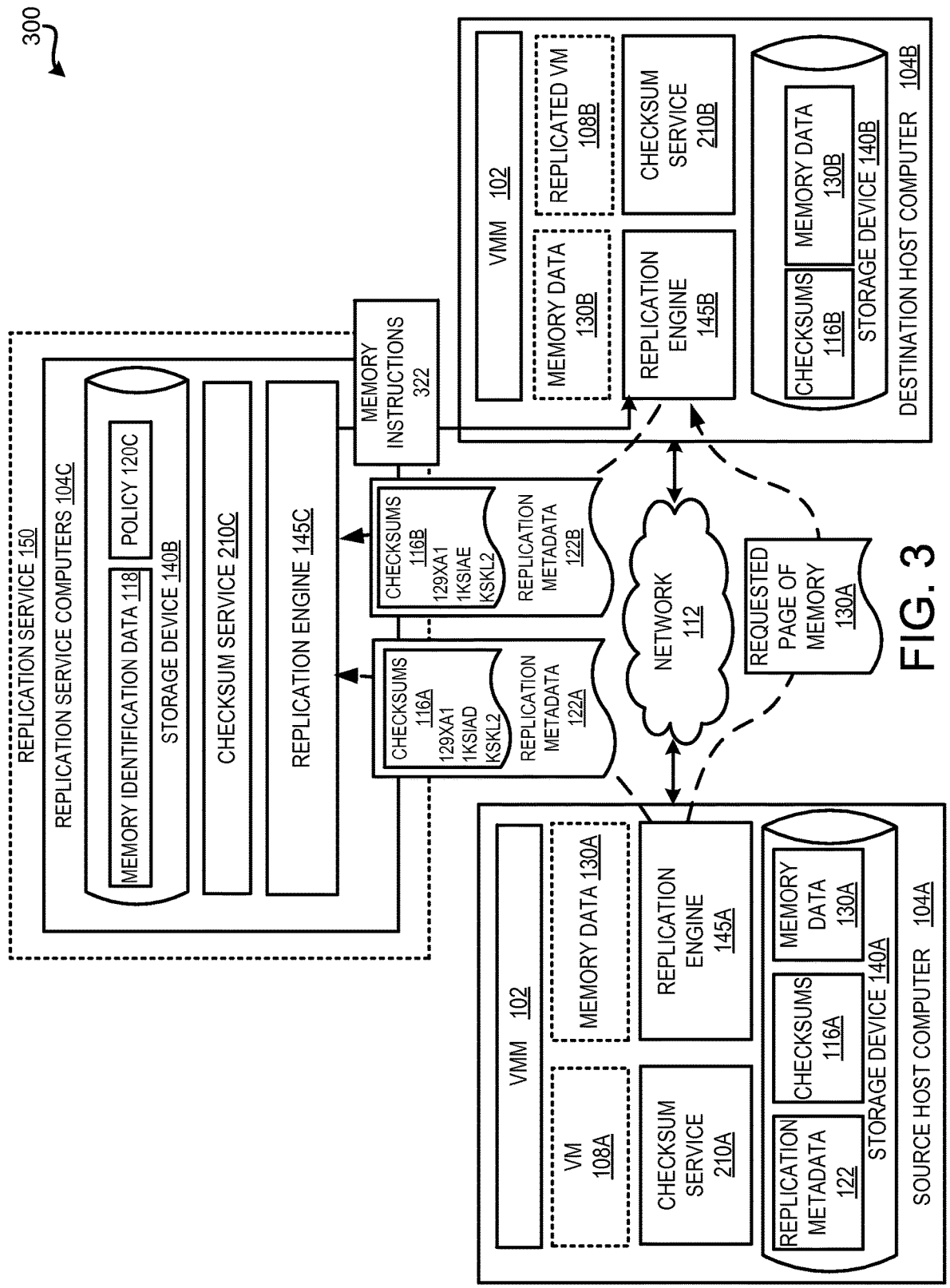
FIG. 3 is a block diagram depicting an illustrative replication system for using checksums to determine memory data to retrieve from local storage when replicating memory data across hosts.

FIG. 3 is a block diagram depicting an illustrative replication system 300 for using checksums 116 to determine memory data to retrieve from local storage when replicating memory data across hosts. As discussed above, a virtual machine 108 may be run by a source host computer 104A, and may execute a guest OS and one or more applications (not shown) to provide services to consumers over the network 112. In addition, the virtual machine 108A may be replicated to a destination host computer 104B, across the network 112.

As discussed above, a replication service 150 may be used to facilitate the replication of the memory data 130A to the destination host computer 104B. In some examples, a replication engine, such as the replication engine 145C that is part of the replication service 150, may compare the checksums 116A that are associated with memory data from the VM 108A to the checksums 116B that are associated with the memory data stored by the destination host on the storage device 140B, or some other data store. The replication engine 145C may compare the checksums 116A to the checksums 116B to identify the chunks of memory data (e.g., blocks or pages of memory) that are the same.

During the replication of the memory data 130A from the source host computer 104A to the destination host computer 104B, the replication engine 145C in the replication service 150 may be used to coordinate the replication the memory data 130A. As discussed above, the replication engine 145C may identify the memory data to replicate and provide memory instructions 322 to the destination host 104B indicating what memory data 130B to copy from local storage 140B and what memory data to request from the source host computer 104A. In some examples, the replication engine 145C requests from the source host computer 104A the checksums 116A associated with the memory data 130A to be replicated. In the case of replicating the VM 108A, the memory data 130A is memory data that is associated with the VM 108A. In some configurations, the replication engine 145A may send the checksums 116A to the replication engine 145C at the start of the replication of the VM 108 or at the start of replication of other memory data.

According to some examples, the replication engine 145A generates replication metadata 122A that identifies the checksums 116A associated with the memory data 130A to be replicated to the destination host computer 104B. In the current example of replicating the VM 108A, the replication metadata 122A uniquely identifies (e.g., checksums) portions of the memory data 130A that are used by the VM 108. The replication metadata 122A may be sent by the checksum service 210A, or the replication engine 145A, to the replication engine 145C or the checksum service 210C in the replication service 150.

Similarly, the replication engine 145B on the destination host computer 104B may be configured to generate replication metadata 122B that identifies the checksums 116B associated with the memory data 130B. The replication metadata 122B uniquely identifies (e.g., checksums) portions of the memory data 130B that are locally stored by the destination host computer 104B. The replication metadata 122B may be sent by the checksum service 210B, or the replication engine 145B, to the replication engine 145C or the checksum service 210C in the replication service 150.

As discussed above, the replication engine 145C may compare the checksums 116A to the checksums 116B to determine the local availability of memory data 130A that is to be replicated (e.g., on the storage device 140B or in some cases, in the main memory of the destination host 104B). During replication, the replication engine 145B may fetch the memory pages used by the VM 108 that are available locally. In some examples, the replication engine 145C instructs the replication engine 145B as to what memory data 130B to obtain from local storage. Thus, clean memory pages from the virtual machine 108 may not be retrieved using the network 112. Instead, all or a portion of the clean memory pages of the memory pages might be retrieved from the local storage 140B. As such, clean memory pages may not be copied between the source host computer 104A and the destination host computer 104B over the network 112 for replication, thus reducing the amount of network bandwidth required by the replication process.

Figure 4:
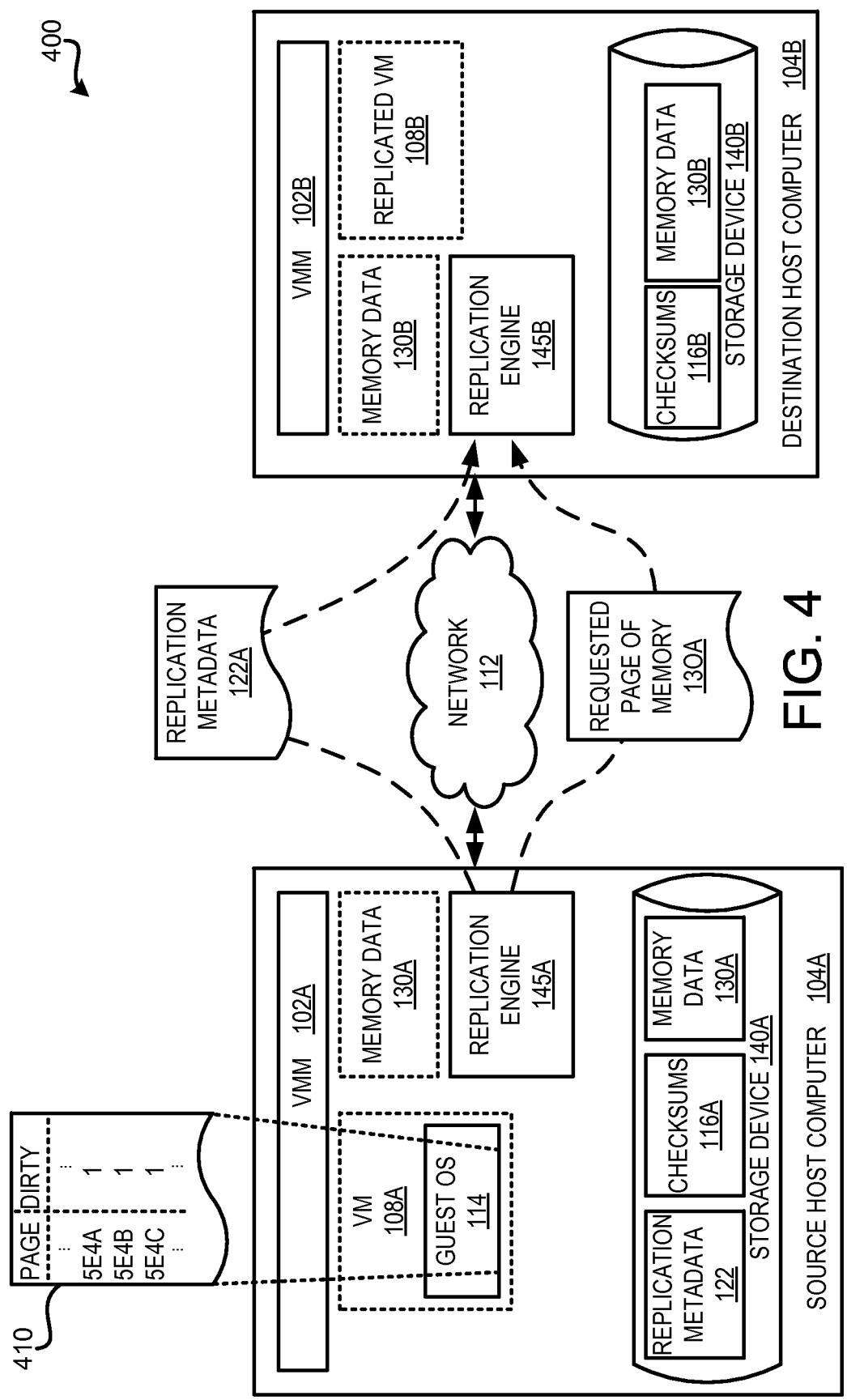
FIG. 4 is a block diagram depicting an illustrative replication system for using a list of dirty pages to determine the memory data that may possibly be replicated from a local storage.

FIG. 4 is a block diagram depicting an illustrative replication system 400 for using a list of dirty pages to determine the memory data that may possibly be replicated from local storage. As discussed above, a virtual machine 108A may be associated with a source host computer 104A, and may execute a guest OS 114 and one or more applications (not shown) to provide services to consumers over the network 112. In addition, the virtual machine 108A may be replicated to a destination host computer 104B to create the replicated VM 108B, across the network 112.

According to some configurations, the source host computer 104A may maintain a page map 410 that identifies the portions of the memory data (e.g., pages) that are "dirty" (i.e. written to). In some configurations, the guest OS 114, the VMM 102, or the replication engine 145A may be utilized to mark a page of memory as dirty (e.g., set a value in the map 410 for a page to "1"). For example, whenever a page of memory is written to by the VM 108A, the guest OS 114, or the VMM 102 may mark the page of memory as "dirty" within the page map 410.

During replication, replication engine 145B on the destination host and/or the replication engine 145C of the replication service 150 may request a status of the memory data 130A that is identified to be transferred (e.g., clean or dirty) during the replication. In some examples, the replication engine 145A generates replication metadata 122A that identifies the dirty pages of memory and/or the clean pages of memory data. The replication engine 145A may send the replication metadata 122A to the replication engine 145B on the destination host computer 104B (e.g., in response to a request). In some configurations, the replication engine 145B may request from the source host computer 104A identification of the memory pages that have been marked dirty since the VM 108A has started execution.

During replication, the replication engine 145B and/or the VMM 102B executing on the destination host computer 104B can retrieve the pages of memory that are dirty from the source host computer 104A. The replication engine 145B may determine from the replication data 122A what is clean and attempt to obtain the clean memory data locally. For example, the checksum mechanism described above might be utilized to determine whether any portion of the memory data 130A is duplicated locally.

In some examples, a duplicate of at least a portion of the memory data 130A may be stored in the storage device 140B. In other examples, a duplicate of all or a portion of the memory data 130A might be stored in the main memory of the destination host computer 104B. As discussed above, the memory data that is a duplicate of the memory data 130A may be copied by the replication engine 145 from the storage device 140B to the main memory. As such, the clean memory data may not be copied between the source host computer 104A and the destination host computer 104B over the network 112. The dirty memory data may be sent by the replication engine 145A to the replication engine 145B on the destination host computer 104B.

As discussed above, in some configurations, the replication service 150, the replication engine 145, the VMM 102, or some other component, may keep track of frequently requested memory data. This may allow the replication service 150 or the replication engine 145 to determine the probability that the memory data will be requested. The replication service 150, VMM 102, the replication engine 145, or some other component may then utilize this information to not wipe (e.g., erase) memory data that might subsequently be requested. In some examples, memory data may be maintained as long as there is available memory space. In other examples, a portion of memory space might be set aside for storing memory data not currently in use.

Turning now to FIGS. 5-8, additional details will be provided regarding replicating memory across host computers using memory data retrieved from local storage. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

Figure 5:
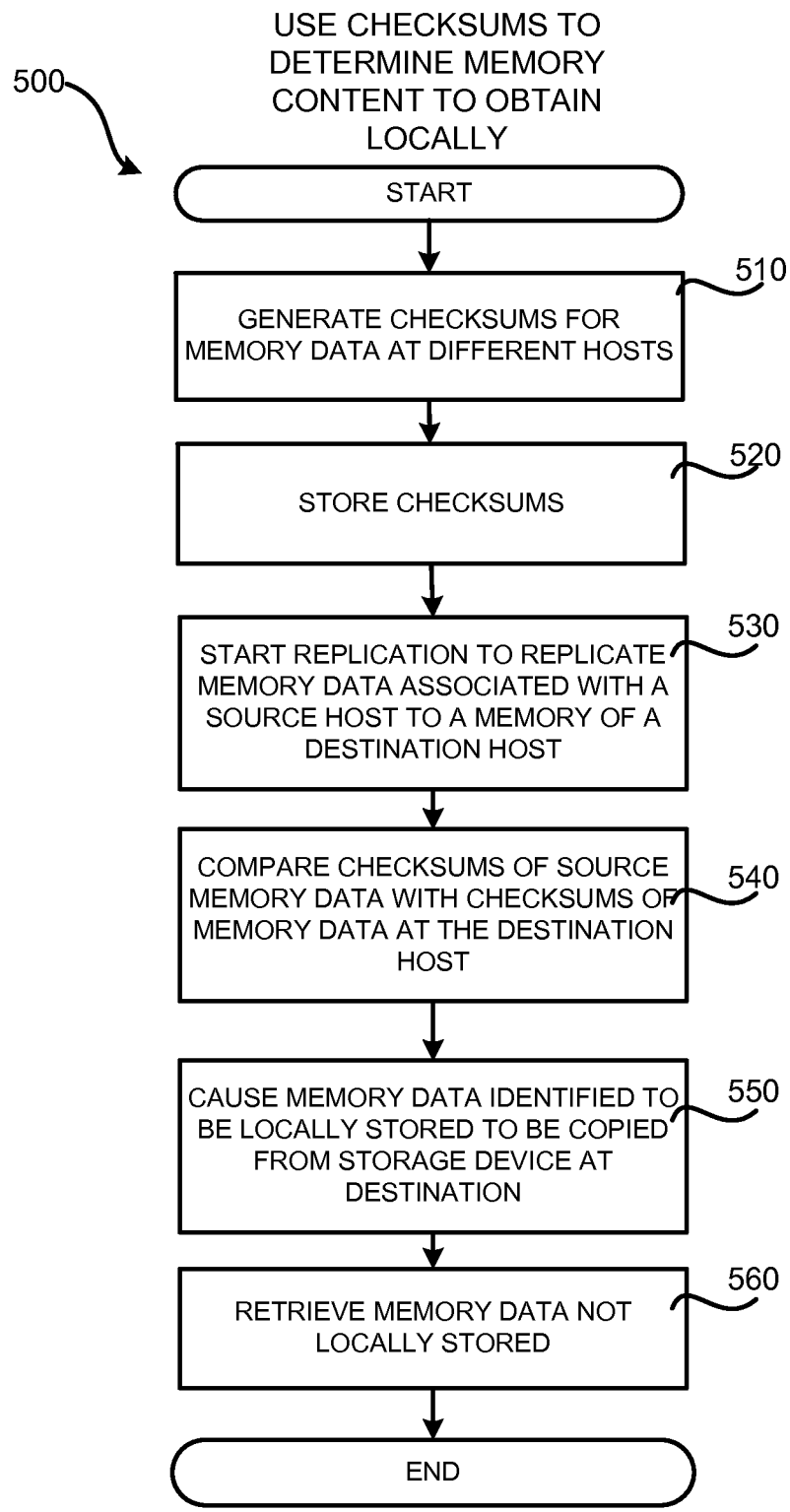
FIG. 5 is a flow diagram showing a routine illustrating aspects of a mechanism disclosed herein for using checksums when replicating memory data from a source host computer to a destination host computer.

FIG. 5 is a flow diagram showing a routine 500 illustrating aspects of a mechanism disclosed herein for using checksums 116 when replicating memory data 130A from a source host computer 104A to a destination host computer 104B. The routine 500 might be performed by the checksum service 210, the VMM 102, the replication engine 145 executing on one or more of the source host computer 104A, the destination host computer 104B, or the replication service 150, by another module or component or computer, or by any combination of modules and components.

The routine 500 may begin at operation 510, where the checksums 116 may be generated for memory data stored on different hosts. As discussed above, the checksum service 210 may generate checksums 116 for chunks of memory data (e.g., blocks or pages) that are available on a host computer. In some configurations, a checksum 116 may be generated for each page of memory that is associated with an execution of a VM 108.

From operation 510, the routine 500 may proceed to operation 520 where the checksums 116 may be stored. As discussed above, the checksums 116 may be stored by the checksum service 210, the replication engine 145, or some other component or module, in the local storage device 140, or some other memory. In some examples, the checksums may be identified by the replication metadata 122A. In an example embodiment, each checksum service 210 or replication engine 145 can include executable instructions for reporting the checksums to the replication service 150. For example, periodically the checksum service 210 can execute and checksum the memory on the instances. The checksums 116 can then be sent directly to the replication service 150 or written to a shared storage location. Next, the replication engine 145C can access the checksums 116.

As described in more detail elsewhere, in an example embodiment a destination host can be selected. From operation 520, the routine 500 may proceed to operation 530 where the replication of the memory data 130A associated with a memory of a host computer to a memory of a destination host is started. As discussed above, the replication may start in response to different events, such as when a VM 108 is to be replicated on another host computer. In other examples, the replication might be to replicate the memory data in a memory of the host computer 104A to a memory of the destination host computer 104B.

From operation 530, the routine 500 may proceed to operation 540 where the checksums 116 may be compared to determine the memory data that are available on the local storage device 140. As discussed above, the replication service 150 and/or some other replication engine 145, may determine the pages of memory that are duplicates on the source host computer 104A and the destination host computer 104B by determining that a portion of the memory data 130A to be replicated has a same checksum value as a portion of the memory data that is locally stored on the destination host computer 104B. In an example embodiment, the replication service can send a message to both the source and destination computer that indicates the memory that either needs to be copied to the destination or is already available on the destination.

From operation 540, the routine 500 may proceed to operation 550 where the memory data identified to be locally stored on the local storage device 140 are copied from the local storage device 140. As discussed above, the replication engine 145B may copy the duplicate memory data from the local storage device 140B to the main memory of the destination host computer 104B. In other examples, the replication engine 145C of the replication service 150 instructs the destination host 104B to copy the locally stored memory.

From operation 550, the routine 500 may proceed to operation 560 where the memory data that are not locally stored may be retrieved from another host. In some examples, a replication engine 145 might request the identified memory data from the source host 104A. In other examples, the replication engine 145 might fetch the identified memory data from a data storage device that is closer to the destination host 104B as compared to the source host 104A.

Figure 6:
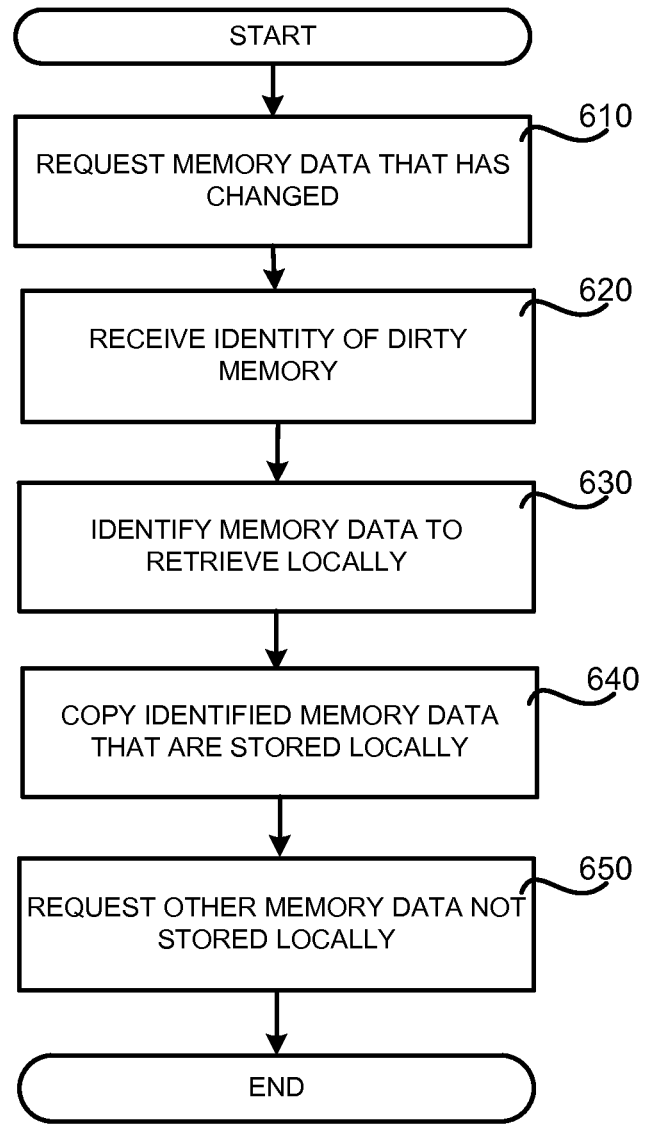
FIG. 6 is a flow diagram showing a routine illustrating aspects of a mechanism disclosed herein for using a map of dirty memory when replicating memory data from a source host computer to a destination host computer.

FIG. 6 is a flow diagram showing a routine 600 illustrating aspects of the operation for using a map 410 of dirty memory when replicating memory data 130A from a source host computer 104A to a destination host computer 104B. The routine 600 may be performed by the VMM 102, or the replication engine 145, executing on one or more of the source host computer 104A, the destination host computer 104B, or the replication service 150, by another module or component or computer, or by any combination of modules and components.

The routine 600 may begin at operation 610, where the memory data that have been written to (e.g., changed) are requested. As discussed above, the memory data that have changed may be requested from the host computer 104A by the replication service 150 and/or a replication engine 145. In some configurations, the host computer 104A maintains the page map 410 that identifies the dirty memory.

From operation 610, the routine 600 may proceed to operation 620 where the identity of the dirty memory data is received. As discussed above, the replication engine 145A operating on the host computer 104A may provide the identity of the dirty memory in the replication metadata 122A.

From operation 620, the routine 600 may proceed to operation 630 where the memory data to retrieve locally may be identified. As discussed above, the memory data that are not dirty may be candidates to obtain locally or from another host computer. In some configurations, the mechanism described above with regard to FIG. 1 and FIG. 2 that utilizes the checksums 116 may be used to determine the memory data that are available from a local storage device 140.

From operation 630, the routine 600 may proceed to operation 640 where the identified memory data are copied from the local storage. For example, the memory data might be fetched from the local storage 140B on the destination host computer 104B.

From operation 640, the routine 600 may proceed to operation 650 where memory data that are not available from local storage 140 are requested. As discussed above, the memory data might be requested from the source host computer 104A or from some other computing device, such as another host computer 104 that might be closer in physical location to the destination host computer 104B. From operation 650, the routine 600 may proceed to and end operation.

Figure 7:
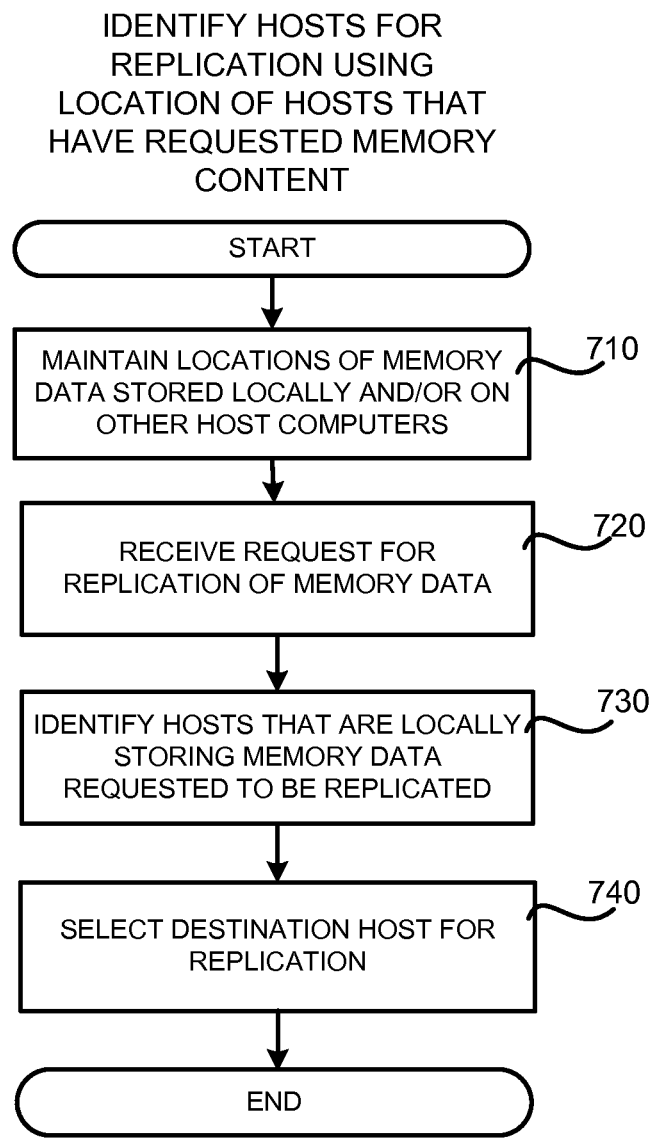
FIG. 7 is a flow diagram showing a routine illustrating aspects of a mechanism disclosed herein for selecting a destination host computer for replication.

FIG. 7 is a flow diagram showing a routine 700 illustrating aspects of the operation for selecting a destination host computer 104B for replication. The routine 700 may be performed by the replication service 150, the replication engine 145 executing on one or more of the source host computer 104A or the destination host computer 104B, by another module or component or computer, or by any combination of modules and components.

The routine 700 may begin at operation 710, where the memory identification data 118 that are stored locally or on other host computers 104 is maintained. As discussed above, the replication service 150 that operates on one or more of the host computers 104 might maintain the memory identification data 118 that identifies the locations of where memory data are stored. For example, the memory identification data 118 maintained by the replication service 150 may identify the memory data that is currently in the main memory of one or more host computers 104. The replication service 150 might also maintain a list of the memory data that are available from the local storage 140 of one or more host computers 104. For example, each host computer (e.g., a server) can run a replication engine 145 that can generate checksums 116 of memory and make the checksums available to the replication service 150. In some examples, a memory profile for each machine image (or at least common machine images) can be generated by the service provider. The profile can represent how the memory is organized in an instance of the machine image before it is used by a customer. Next, the profile can be stored in a storage system that the replication service 150 can access. As instances of machine images run, the replication engines 145 running on the hosts 104 can periodically, or in response to a specific event such as a request to migrate the virtual machine, checksum the memory of each instance and make the checksums 116 available to the replication service 150 (e.g., by sending the checksums to the service or writing the checksums to a storage system that the replication service can access).

From operation 710, the routine 700 may proceed to operation 720 where a request for replication of memory data may be received. As discussed above, the request for replication of the memory data 130A might be in response to replication of a VM 108, or in response to some other event. For example, the replication of the memory data 130A might be requested in response to a determination by a program or user to mirror the memory data 130A to another host. In some examples, the replication engine 145 may request the replication of the memory data 130A from the host computer 104A to another host computer 104. According to some configurations, the replication service 150 receives the request before the destination host computer 104B is selected.

From operation 720, the routine 700 may proceed to operation 730 where the hosts that are locally storing memory data to be replicated are identified. As discussed above, the replication service 150 may identify one or more hosts that have at least a portion of the requested memory in a main memory or a local storage device 140 associated with the host computer 104. Some identified hosts may store more of the requested memory data as compared to other hosts. For example, the replication service 150 may execute a procedure for selecting a host. In an embodiment, the replication service 150 may generate a list of hosts and filter out hosts that are unsuitable to host the instance. For example, this could include (in no particular order) filtering out servers that do not have the hardware necessary to host the instance, filtering out servers that do not have room available to host new instances, filtering out servers that are far from the source from a network perspective, filtering out servers that have low percentages of memory in common (based on the checksums), and the like. The percentage can be set by one of skill in the art based on how much of a priority he or she wants to give to memory commonality and/or what memory commonality is average across the fleet of servers. For example, a high percentage biases the replication service 150 in favor of selecting a server that has lots of memory in common at a potential cost of having lots of suitable destination targets. Next, the replication service 150 may randomly select a destination from the filtered list. In an alternative configuration, instead of filtering out hosts that do not share memory in common, the replication service 150 may take the list of suitable hosts and identify one or more that have the most memory in common (based on the checksums) and randomly pick one to serve as the destination.

From operation 730, the routine 700 may proceed to operation 740 where the destination host is selected for replication of the memory data. As discussed above, the replication service 150 might select the destination host using different selection criteria, such as how much of the requested memory data the host is storing locally, available resources of the host (e.g., memory, processing), a distance of the host to the source host computer 104A, a distance of the host to a host identified to have at least a portion of the requested memory data 130A locally stored, and the like.

After selecting the host, the replication of the memory data 130A from the source host computer 104A to the main memory of the destination host computer 104 may be performed in the manner described above. From operation 740, the routine 700 may proceed to and end operation.

Figure 8:
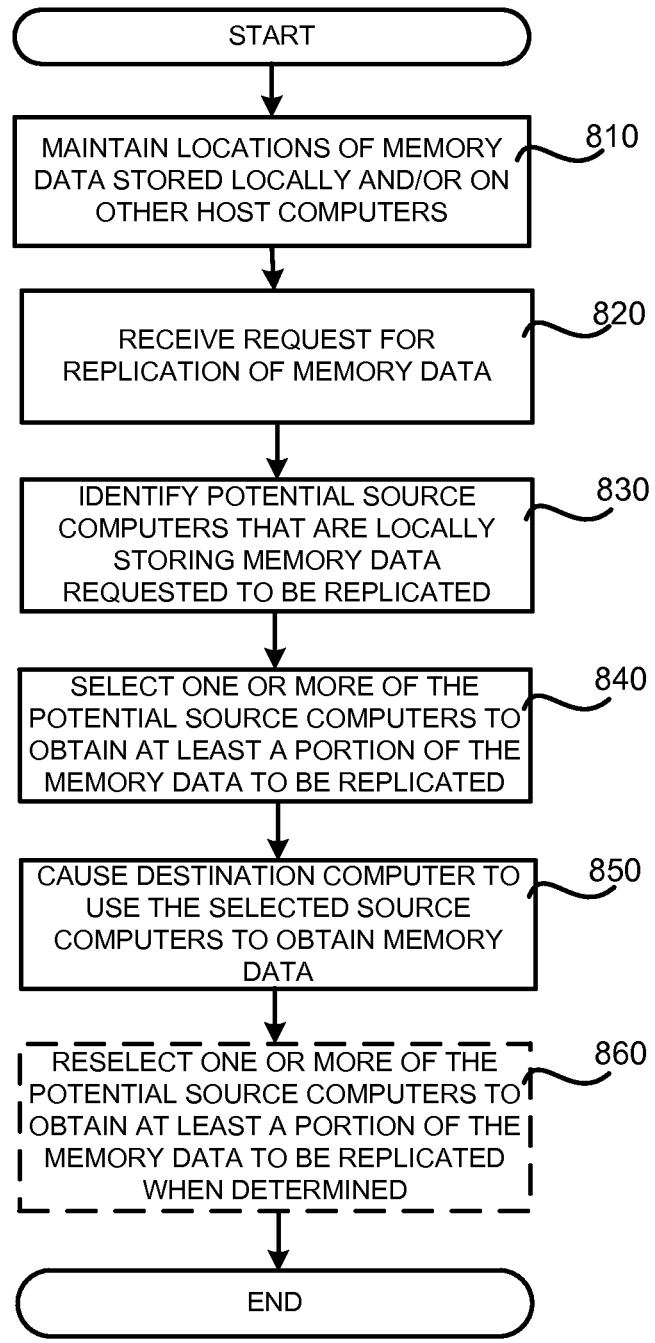
FIG. 8 is a flow diagram showing a routine illustrating aspects of the operation for selecting one or more source hosts used for replication.

FIG. 8 is a flow diagram showing a routine 800 illustrating aspects of the operation for selecting one or more source hosts used for replication. The routine 800 may be performed by the replication service 150, the replication engine 145 executing on one or more of the host computer 104A, the destination host computer 104B, the potential source computers 104D-104G, by another module or component or computer, or by any combination of modules and components.

The routine 800 may begin at operation 810, where the memory identification data 118 that are stored locally, by the destination computer, or on other potential source computers 104 is maintained. As discussed above, the replication service 150 that operates on one or more of the host computers 104 might maintain the memory identification data 118 that identifies the locations of where memory data are stored.

From operation 810, the routine 800 may proceed to operation 820 where a request for replication of memory data may be received. As discussed above, the request for replication of the memory data 130A might be in response to replication of a VM 108, or in response to some other event. For example, the replication of the memory data 130A might be requested in response to a determination by a program or user to mirror the memory data 130A to another host. In some examples, the replication engine 145 may request the replication of the memory data 130A from the host computer 104A to another host computer 104. As discussed above, the replication service 150 may receive the request before the destination host computer 104B is selected.

From operation 820, the routine 800 may proceed to operation 830 where the potential source computers 104D-104G that are locally storing memory data to be replicated are identified. As discussed above, the replication service 150 may identify one or more of the potential source computers 104D-104G that have at least a portion of the requested memory in a main memory or a local storage device 140 associated with the computer 104. Some identified potential source computers 104D-104G may store more of the requested memory data as compared to other potential source computers 104D-104G.

From operation 830, the routine 800 may proceed to operation 840 where one or more of the potential source computers 104D-104G that are identified as storing at least a portion of the requested memory are selected. As discussed above, the replication service 150 might select the one or more of the potential source computers 104D-104G using different selection criteria. For example, the selection might be based on a network location of the potential source computer relative to the destination host 104B (e.g., number of hops), a bandwidth available between the potential source computer and the destination host 104B, available resources of the host (e.g., memory, processing), a current or predicted usage of the potential source computer during the replication, an amount of memory data to replicate available from the potential source computer, and the like. According to some configurations, the replication service 150 initially selects the one or more potential source computers 104D-104G based, at least in part, on the available bandwidth between the potential source computers 104D-104G and the destination computer 104B. One or more of the potential source computers 104D-104G might be selected. For example, a predetermined number of potential source computers 104D-104G might be selected, the number of potential source computers 104D-104G might be selected on an amount of memory data to replicate, or the decision of how many potential source computers 104D-104G to utilize might be made using some other factor(s).

From operation 840, the routine 800 may proceed to operation 850 where the destination computer 104B is caused to obtain at least a portion of the memory data from the selected source computers 104. As discussed above, the replication service 150 might instruct the destination computer 104B to obtain memory data from one or more of the selected source computers 104D-104G. In other examples, the replication service 150 might instruct one or more of the selected source computers 104D-104G to provide memory data to be replicated to the destination computer 104B.

From operation 840, the routine 800 may proceed to operation 860 where a reselection of the one or more potential source computers 104D-104G might be performed. As discussed above, the reselection might be performed periodically during the replication of the memory and/or in response to some event or condition. For example, the replication service 150, or some other component, might determine that an available bandwidth between a previously unselected potential source computers has increased that is closer (e.g., fewer hops) to the destination host 104B. The replication service 150 might also determine that the available resources (e.g., memory or processing) might have increased or decreased since the previous selection. Generally, the reselection might be performed based on a variety of different conditions. From operation 860, the routine 800 may proceed to and end operation.

Figure 9:
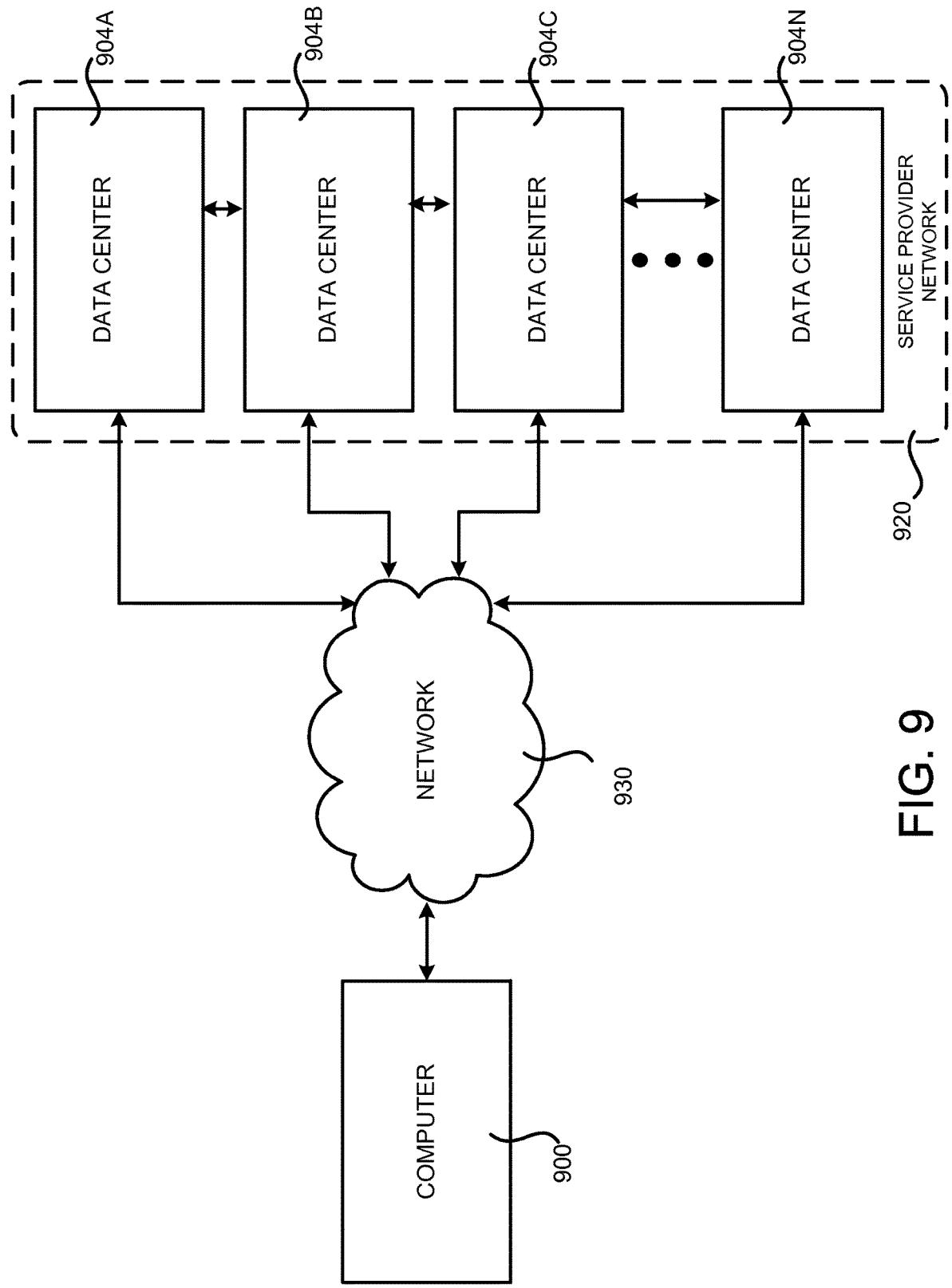
FIG. 9 is a system and network diagram that shows one illustrative operating environment for the technologies disclosed herein that includes a service provider network.

FIG. 9 and the following description are intended to provide a brief, general description of a suitable computing environment in which the technologies described herein may be implemented. In particular, FIG. 9 is a system and network diagram that shows an illustrative operating environment that includes a service provider network 920. In some configurations, the service provider network 920 can provide virtual machine instances and computing resources on a permanent or an as-needed basis.

The computing resources provided by the service provider network 920 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by the service provider network 920 are enabled in one implementation by one or more data centers 904A-904N (which may be referred to herein singularly as "a data center 904" or collectively as "the data centers 904"). The data centers 904 are facilities utilized to house and operate computer systems and associated components. The data centers 904 typically include redundant and backup power, communications, cooling and security systems. The data centers 904 might also be located in geographically disparate locations. One illustrative configuration for a data center 904 that implements some or all of the concepts and technologies disclosed herein will be described below with regard to FIG. 10.

Figure 11:
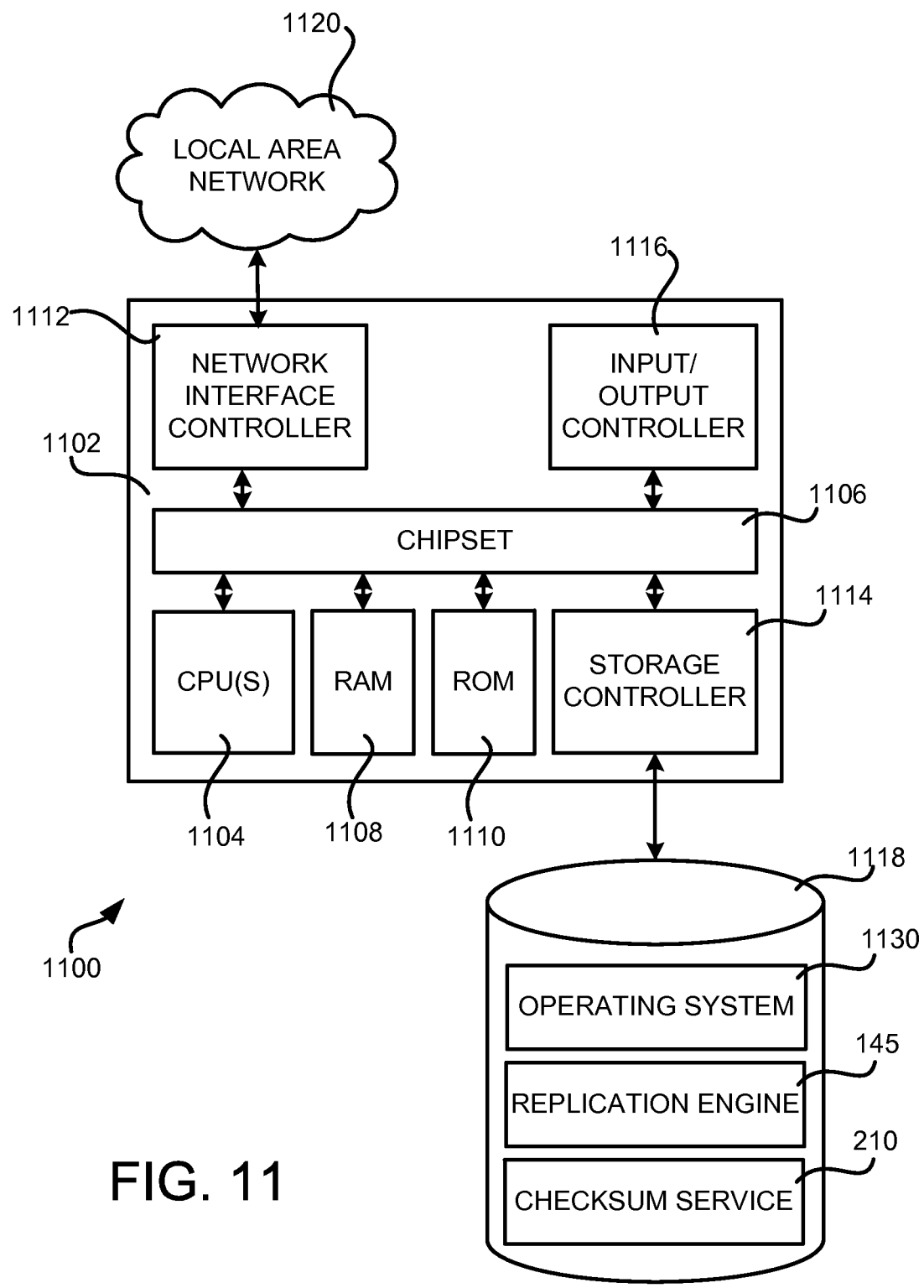
FIG. 11 is a computer architecture diagram showing an illustrative computer hardware architecture for implementing a computing device that might be utilized to implement aspects of the various technologies presented herein.

The users and customers of the service provider network 920 may access the computing resources provided by the data centers 904 over a suitable data communications network, such as a Wide Area Network ("WAN"), as illustrated by network 930. Although a WAN might be used, it should be appreciated that a local-area network ("LAN"), the Internet, or any other networking topology known in the art that connects the data centers 904 to the computer 1100 (as shown in FIG. 11) may be utilized. It should also be appreciated that combinations of such networks might also be utilized.

Figure 10:
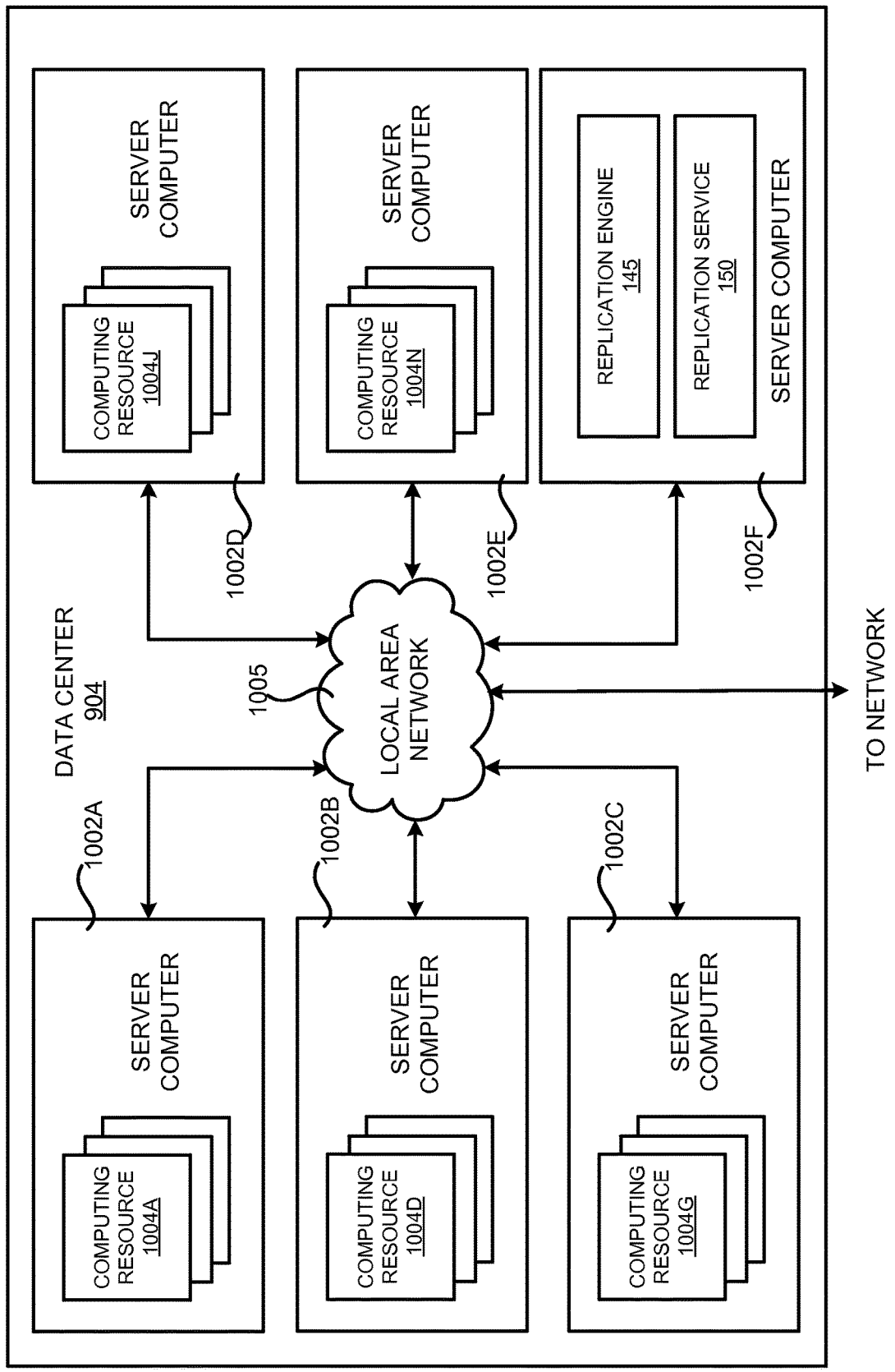
FIG. 10 is a computing system diagram that illustrates one configuration for a data center that implements aspects of a service provider network, including some or all of the concepts and technologies disclosed herein relating to replicating memory data from a source host computer to a memory of the destination host computer.

FIG. 10 is a computing system diagram that illustrates one configuration for a data center 904 that implements aspects of a service provider network 920, including some or all of the concepts and technologies disclosed herein relating to replicating memory data 130A from a source host computer 104A to a memory of the destination host computer 104B. The example data center 904 shown in FIG. 10 includes several server computers 1002A-1002E (which may be referred to herein singularly as "a server computer 1002" or in the plural as "the server computers 1002") for providing computing resources. The server computers 1002 may be standard tower or rack-mount server computers configured appropriately for providing the computing resources described herein. According to some configurations, the server computers 1002 are configured to execute the replication service 150, or other components, as described above.

In one configuration, some of the computing resources 1004 are virtual machine instances. As known in the art, a virtual machine instance is an instance of a software implementation of a machine (i.e. a computer) that executes programs like a physical machine. Each of the server computers 1002 may be configured to execute an instance manager (not shown) capable of instantiating and managing computing resources and instances of computing resources. In the case of virtual machine instances, for example, the instance manager might be a hypervisor or another type of program configured to enable the execution of multiple virtual machine instances on a single server computer 1002, for example.

It should be appreciated that although the technologies disclosed herein are described primarily in the context of virtual machine instances, other types of computing resources can be utilized with the concepts and technologies disclosed herein. For instance, the technologies disclosed herein might be utilized with hardware resources, data storage resources, data communications resources, networking resources, database resources and with other types of computing resources.

The data center 904 shown in FIG. 10 also includes a server computer 1002F reserved for executing software components for managing the operation of the data center 904, the server computers 1002, virtual machine instances, and other resources within the service provider network 920. The server computer 1002F might also execute the replication engine 145, the replication service 150, as well as other components described herein. Details regarding the operation of each of these components has been provided above. In this regard, it should be appreciated that while these components are illustrated as executing within the service provider network 920, computing systems that are external to the service provider network 920 might also be utilized to execute some or all of these components. Other configurations might also be utilized.

In the example data center 904 shown in FIG. 10, an appropriate LAN 1005 is utilized to interconnect the server computers 1002A-1002E and the server computer 1002F. The LAN 1005 is also connected to the network 930 illustrated in FIG. 9. It should be appreciated that the configuration and network topology illustrated in FIGS. 9 and 10 has been greatly simplified and that many more computing systems, networks and networking devices may be utilized to interconnect the various computing systems disclosed herein. Appropriate load balancing devices or software modules might also be utilized for balancing a load between each of the data centers 904A-904N, between each of the server computers 1002A-1002F in each data center 904 and between virtual machine instances and other types of computing resources provided by the service provider network 920.

It should be appreciated that the data center 904 described in FIG. 9 is merely illustrative and that other implementations might also be utilized. Additionally, it should be appreciated that the functionality provided by these components might be implemented in software, hardware, or a combination of software and hardware. Other implementations should be apparent to those skilled in the art.

FIG. 11 shows an example computer architecture for a computer 1100 capable of executing the program components described above for providing and utilizing a replication service. The computer architecture shown in FIG. 11 illustrates a conventional server computer, workstation, desktop computer, laptop, tablet computing device, network appliance, personal digital assistant ("PDA"), e-reader, digital cellular phone, or other computing device, and may be utilized to execute any aspects of the software components presented herein. For example, the computer architecture shown in FIG. 11 may be utilized to execute the replication engine 145, the checksum service 210 and/or the other components shown in the FIGS. and described above.

The computer 1100 includes a baseboard 1102, or "motherboard," which is a printed circuit board to which a multitude of components or devices may be connected by way of a system bus or other electrical communication paths. In some configurations, one or more central processing units ("CPUs") 1104 operate in conjunction with a chipset 1106. The CPUs 1104 may be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 may provide an interface to a random access memory ("RAM") 1108, used as the main memory in the computer 1100. The chipset 1106 may further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM may also store other software components necessary for the operation of the computer 1100 in accordance with the technologies described herein.

The computer 1100 may operate in a networked environment using logical connections to remote computing devices and computer systems through a network, such as the local area network 1120. The chipset 1106 may include functionality for providing network connectivity through a NIC 1112, such as a gigabit Ethernet adapter. The NIC 1112 is capable of connecting the computer 1100 to other computing devices over the network 1120. It should be appreciated that multiple NICs 1112 may be present in the computer 1100, connecting the computer to other types of networks and remote computer systems.

The computer 1100 may be connected to a mass storage device 1118 that provides non-volatile storage for the computer. The mass storage device 1118 may store system programs, application programs, other program modules, and data, which have been described in greater detail herein. The mass storage device 1118 may be connected to the computer 1100 through a storage controller 1114 connected to the chipset 1106. The mass storage device 1118 may consist of one or more physical storage units. The storage controller 1114 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1100 may store data on the mass storage device 1118 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1118 is characterized as primary or destination storage, and the like.

For example, the computer 1100 may store information to the mass storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 may further read information from the mass storage device 1118 by detecting the physical states or characteristics of one or more particular locations within the physical storage units.

In addition to the mass storage device 1118 described above, the computer 1100 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 1100.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1118 may store an operating system 1130 utilized to control the operation of the computer 1100. According to some examples, the operating system comprises the LINUX operating system. According to another example, the operating system comprises the WINDOWS® SERVER operating system from MICROSOFT Corporation. According to further examples, the operating system may comprise the UNIX operating systems. It should be appreciated that other operating systems may also be utilized. The mass storage device 1118 may store other system or application programs and data utilized by the computer 1100, such as the replication engine 145, and/or any of the other software components and data described above. The mass storage device 1118 might also store other programs and data not specifically identified herein.

In some configurations, the mass storage device 1118 or other computer-readable storage media is encoded with computer-executable instructions which, when loaded into the computer 1100, transforms the computer from a general-purpose computing system into a special-purpose computer capable of implementing the technologies described herein. These computer-executable instructions transform the computer 1100 by specifying how the CPUs 1104 transition between states, as described above. According to some examples, the computer 1100 has access to computer-readable storage media storing computer-executable instructions which, when executed by the computer 1100, perform the various routines described above with regard to FIGS. 5-8. The computer 1100 might also include computer-readable storage media for performing any of the other computer-implemented operations described herein.

The computer 1100 may also include one or more input/output controllers 1116 for receiving and processing input from a number of input devices, such as a keyboard, a mouse, a touchpad, a touch screen, an electronic stylus, or other type of input device. Similarly, the input/output controller 1116 may provide output to a display, such as a computer monitor, a flat-panel display, a digital projector, a printer, a plotter, or other type of output device. It will be appreciated that the computer 1100 may not include all of the components shown in FIG. 11, may include other components that are not explicitly shown in FIG. 11, or may utilize an architecture completely different than that shown in FIG. 11.

Based on the foregoing, it should be appreciated that technologies for reducing network traffic when replicating memory data across hosts have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. A non-transitory computer-readable storage medium having computer-executable instructions stored thereon that, when executed by a computer, cause the computer to:
   receive a request to migrate first memory data associated with a virtual machine from a source computer of a service provider network to a destination computer of the service provider network, the source computer disposed in a first geographic location and the destination computer disposed in a second geographic location that is different than the first geographic location, wherein the first memory data is stored by the source computer;
   determine a first network distance between the first geographic location of the source computer and the second geographic location of the destination computer;
   identify a potential source computer of the service provider network, the potential source computer storing second memory data corresponding to a first portion of the first memory data, the potential source computer disposed in a third geographic location that is different than the first geographic location and the second geographic location;
   determine a second network distance between the third geographic location of the potential source computer and the second geographic location of the destination computer; and
   based at least in part on the second network distance being less than the first network distance:
      copy, from the potential source computer to the destination computer, the second memory data corresponding to the first portion of the first memory data; and
      copy, from the source computer to the destination computer, a second portion of the first memory data.

2. The non-transitory computer-readable storage medium of claim 1, wherein the destination computer stores third memory data corresponding to a third portion of the first memory data associated with the virtual machine, and wherein the computer-executable instructions, when executed by the computer, further cause the computer to select, based at least in part on the third memory data, the destination computer for migration of the virtual machine.

3. The non-transitory computer-readable storage medium of claim 1, wherein the computer-executable instructions, when executed by the computer, further cause the computer to select, based at least in part on the third geographic location of the potential source computer, the destination computer for migration of the virtual machine.

4. The non-transitory computer-readable storage medium of claim 1, wherein the computer-executable instructions, when executed by the computer, further cause the computer to:

determine a first network bandwidth between the potential source computer and the destination computer; and
determine a second network bandwidth between the source computer and the destination computer,
wherein copying the second memory data from the potential source computer to the destination computer is based at least in part on the first network bandwidth being greater than the second network bandwidth.

5. A system, comprising:
one or more computers configured to:
receive a request to replicate, on a destination computer, first memory data stored by a source computer, the source computer and the destination computer associated with a service provider network;
obtain memory identification data stored in a database associated with the service provider network, the memory identification data identifying second memory data stored by a potential source computer, the potential source computer associated with the service provider network;
determine, based at least in part on the memory identification data, that the second memory data corresponds to a portion of the first memory data;
determine a first network bandwidth between the potential source computer and the source computer;
determine a second network bandwidth between the source computer and the destination computer; and
based at least in part on the first network bandwidth being greater than the second network bandwidth, cause the destination computer to replicate the second memory data.

6. The system of claim 5, wherein the source computer is disposed in a first geographic location, the destination computer is disposed in a second geographic location that is different than the first geographic location, the potential source computer is disposed in a third geographic location that is different than the first geographic location and the second geographic location, and the one or more computers are further configured to:
determine a first distance between the first geographic location of the source computer and the second geographic location of the destination computer; and
determine a second distance between the third geographic location of the potential source computer and the second geographic location of the destination computer,
wherein causing the destination computer to replicate the second memory data is further based at least in part on the second distance being less than the first distance.

7. The system of claim 5, wherein the portion of the first memory data comprises a first portion of the first memory data, and wherein the one or more computers are further configured to identify one or more second portions of the first memory data that are clean by requesting from the source computer, data indicating one or more of dirty memory data of the first memory data or clean memory data of the first memory data.

8. The system of claim 5, wherein the portion of the first memory data comprises a first portion of the first memory data, and wherein the one or more computers are further configured to prevent an eviction of at least one of a second portion of the first memory data of the source computer or the second memory data of the potential source computer based at least in part on a predicted use of the second portion of the first memory data or the second memory data.

9. A computer-implemented method, comprising:
receiving a request to replicate, from a first computer to a second computer, first memory data stored by the first computer, the second computer storing second memory data corresponding to a first portion of the first memory data, the first computer and the second computer associated with a service provider network;
obtaining memory identification data stored in a database associated with the service provider network, the memory identification data identifying third memory data stored by a third computer associated with the service provider network, the third memory data corresponding to a second portion of the first memory data;
determining a first network distance between the second computer and the third computer;
determining a second network distance between the first computer and the second computer; and
based at least in part on the first network distance being less than the second network distance:
causing the second computer to replicate the third memory data stored by the third computer; and
causing the second computer to replicate a third portion of the first memory data stored by the first computer.

10. The non-transitory computer-readable storage medium of claim 1, wherein the destination computer stores third memory data, and wherein the computer-executable instructions, when executed by the computer, further cause the computer to:
determine that the third memory data corresponds to a third portion of the first memory data; and
select, based at least in part on the third memory data corresponding to the third portion of the first memory data, the second computer for migration of the virtual machine.

11. The non-transitory computer-readable storage medium of claim 1, wherein the destination computer stores third memory data, and wherein the computer-executable instructions, when executed by the computer, further cause the computer to:
determine that the third memory data corresponds to a third portion of the first memory data;
determine that the third memory data is larger than the second memory data; and
select, based at least in part on the third memory data being larger than the second memory data, the second computer for migration of the virtual machine.

12. The system of claim 5, wherein the portion of the first memory data comprises a first portion of the first memory data, the destination computer stores third memory data, and the one or more computers are further configured to:
determine, based at least in part on the memory identification data, that the third memory data corresponds to a second portion of the first memory data; and
select, based at least in part on the third memory data corresponding to the second portion of the first memory data, the destination computer for replicating the first memory data.

13. The system of claim 5, wherein the portion of the first memory data comprises a first portion of the first memory data, the destination computer stores third memory data, and the one or more computers are further configured to:
determine that the third memory data corresponds to a second portion of the first memory data;
determine that the second portion of the first memory data is larger than the first portion of the first memory data; and select, based at least in part on the second portion of the first memory data being larger than the first portion of the first memory data, the destination computer for replication of the first memory data.

14. The computer-implemented method of claim 9, further comprising:
determining that the second memory data corresponding to the first portion of the first memory data is larger than the third memory data corresponding to the second portion of the first memory data,
wherein replicating the first memory data on the second computer is based at least in part on the second memory data being larger than the third memory data.

15. The non-transitory computer-readable storage medium of claim 1, wherein the computer-executable instructions, when executed by the computer, further cause the computer to:
obtain, from the source computer, first checksum data corresponding to one or more first pages of the first memory data stored by the source computer;
obtain, from the potential source computer, second checksum data corresponding to one or more second pages of the second memory data stored by the potential source computer; and
determine, based at least in part on comparing the first checksum data with the second checksum data, that at least one of the one or more second pages of the second memory data is a duplicate of at least one of the one or more first pages of the first memory data.

16. The non-transitory computer-readable storage medium of claim 15, wherein identifying the potential source computer is based at least in part on comparing the first checksum data with the second checksum data.

17. The system of claim 5, wherein the one or more computers are further configured to determine a second network bandwidth between the source computer and the destination computer.

18. The system of claim 5, wherein the memory identification data comprises first checksum data corresponding to one or more first pages of the second memory data stored by the potential source computer, and wherein the one or more computers are further configured to:
obtain, from at least one of the source computer or the database, second checksum data corresponding to one or more second pages of the first memory data stored by the source computer; and
determine, based at least in part on comparing the first checksum data with the second checksum data, that at least one of the one or more second pages of the second memory data is a duplicate of at least one of the one or more first pages of the first memory data.

19. The computer implemented method of claim 9, further comprising:
determining a first network bandwidth between the second computer and the third computer; and
determining a second network bandwidth between the first computer and the second computer,
wherein causing the second computer to replicate the third memory data stored by the third computer is further based at least in part on the first network bandwidth being greater than the second network bandwidth.

20. The computer implemented method of claim 9, wherein the first computer is disposed in a first geographic location, the second computer is disposed in a second geographic location that is different than the first geographic location, and the third computer is disposed in a third geographic location that is different than the first geographic location and the second geographic location.

\* \* \* \* \*